(12) United States Patent
Kumar et al.

(10) Patent No.: US 9,198,009 B2
(45) Date of Patent: Nov. 24, 2015

(54) SYSTEM AND METHOD FOR PROVIDING END TO END INTERACTIVE MOBILE APPLICATIONS USING SMS

(75) Inventors: Pawan Kumar, New Delhi (IN); Madhu Sudan Kapoor, New Delhi (IN)

(73) Assignee: Hughes Systique India Private Limited, New Delhi (IN)

( * ) Notice: Subject to any disclaimer, the term of this patent is extended or adjusted under 35 U.S.C. 154(b) by 612 days.

(21) Appl. No.: 13/580,350

(22) PCT Filed: Feb. 22, 2010

(86) PCT No.: PCT/IB2010/050762
§ 371 (c)(1),
(2), (4) Date: Nov. 16, 2012

(87) PCT Pub. No.: WO2012/001456
PCT Pub. Date: Jan. 5, 2012

(65) Prior Publication Data
US 2013/0059613 A1    Mar. 7, 2013

(51) Int. Cl.
*H04W 4/00* (2009.01)
*H04W 4/14* (2009.01)
*G06Q 30/02* (2012.01)
*H04L 12/58* (2006.01)

(52) U.S. Cl.
CPC ............... *H04W 4/14* (2013.01); *G06Q 30/02* (2013.01); *H04L 51/046* (2013.01); *H04W 4/001* (2013.01); *H04L 51/38* (2013.01)

(58) Field of Classification Search
CPC combination set(s) only.
See application file for complete search history.

(56) References Cited

U.S. PATENT DOCUMENTS

| | | | |
|---|---|---|---|
| 5,675,752 A | 10/1997 | Scott et al. | |
| 6,874,029 B2 | 3/2005 | Hutcheson et al. | |
| 2002/0052781 A1 | 5/2002 | Aufricht et al. | |
| 2002/0083461 A1 | 6/2002 | Hutcheson et al. | |
| 2002/0119793 A1 | 8/2002 | Hronek et al. | |
| 2002/0128908 A1* | 9/2002 | Levin et al. | 705/14 |
| 2003/0023440 A1* | 1/2003 | Chu | 704/249 |
| 2004/0210479 A1* | 10/2004 | Perkowski et al. | 705/14 |
| 2005/0010475 A1* | 1/2005 | Perkowski et al. | 705/14 |
| 2007/0155411 A1 | 7/2007 | Morrison | |
| 2007/0180477 A1 | 8/2007 | Hutcheson | |
| 2007/0294177 A1 | 12/2007 | Volk et al. | |
| 2008/0119132 A1 | 5/2008 | Rao | |
| 2008/0119228 A1 | 5/2008 | Rao | |
| 2009/0164564 A1* | 6/2009 | Willis | 709/203 |
| 2013/0212179 A1* | 8/2013 | Scotto Di Carlo et al. | 709/204 |

OTHER PUBLICATIONS

International Search Report for International Application No. PCT/IB10/50762 dated May 8, 2012.

* cited by examiner

*Primary Examiner* — Diane Mizrahi
(74) *Attorney, Agent, or Firm* — Knobbe Martens Olson & Bear LLP (57) ABSTRACT

System and method for providing end to end interactive mobile applications are described. The present invention provides a complete solution for implementing and distributing interactive mobile applications via short message service. The instant invention is a new process for developing, managing, transmitting and rendering mobile interactive applications through short messaging service. The mobile interactive application is developed using web based interactive development environment. Once the application is developed, the application is delivered to large number of mobile stations through SMS channel by an application provider. The received application on the mobile station is rendered and executed, and the user is able to interact with the application. Further, the user can also send the response to the application provider resulting in a two way communication.

25 Claims, 9 Drawing Sheets

SYSTEM AND METHOD FOR PROVIDING END TO END INTERACTIVE MOBILE APPLICATIONS USING SMS

CROSS REFERENCE TO RELATED APPLICATIONS

This application claims the benefit and priority to and is a U.S. National Phase Application of PCT International Application Number PCT/IB2010/050762, filed on Feb. 22, 2010, designating the United States of America and published in the English language. The disclosures of the above-referenced applications are hereby expressly incorporated by reference in their entireties.

TECHNICAL FIELD

The present invention relates to a wireless information processing system and a method for providing end to end interactive mobile applications. The instant invention more particularly relates to a method and system for implementing and distributing mobile interactive applications via short message service center (SMSC).

BACKGROUND

Cellular networks allow a cellular phone to connect to a nearby cellular base station through an air interface for wireless access to a telephone network. Recent developments in wireless telephone systems allow not only voice communications but also data communications. With networks growing in capacity and bandwidth, there is a strong demand by the industry in being able to deploy applications that can utilize the network growth by rolling out innovative applications. However, even though networks are gaining in capacity and capabilities, a vast majority of networks still have low bandwidth available that are not conducive to heavy OTA traffic.

A problem exists in development of mobile data services due to the significant variances between mobile devices and underlying wireless technologies. Typically, each mobile data service must be tailored to the specific to type of equipment and technology that will use the service. Consequently, an application developed for one manufacturer's equipment or network provider's technology may not work for other types of equipment and technologies. This requires a standardization, which provides a generic model where applications can be written without keeping in mind the equipment and the technology.

Another problem encountered in development of mobile data services is on the network side. Wireless networks are constrained by less bandwidth, more latency, less predictable availability than conventional wired networks. These limitations result in significant problems for accurate and timely delivery of mobile data to mobile devices by the service. Mobile users due to the nature of being 'on the move' need to obtain information and data in a more efficient and timely manner than desktop or laptop users using traditional web browsers. Further, as bandwidth increases, the handset's power consumption also increases which further deteriorates the already limited battery life of a mobile device. Therefore, even as wireless networks improve their ability to deliver higher bandwidth, the power availability of the mobile device will still limit the effective throughput of data to and from the mobile device. Also, screen size, memory and plug-in functionality on the handheld device may be significantly lower than what is available through a browser on a laptop, so that a Web page easily viewed on a laptop is essentially unintelligible on the mobile device. A network-based service cannot rely on a particular mobile device having a screen of needed size or having the power to execute a full browser application.

Complex interactions, such as those involving shopping online or employing an expert system to diagnose symptoms of a problem, require many messages to be sent back and forth between a client process and one or more server processes. Because there is vide variety of mobile devices, with a wide range of screen sizes, colors, memory sizes, processor types and client protocols, it is generally cost prohibitive to try to duplicate all the functionality of a network-based service for each possible mobile device.

Various systems exist that describe the systems and methods to generate and provide interactive applications to the wireless devices which are herein mentioned below.

US 2008/0119228 describes about a system for mobile devices that facilitates the creation and dissemination of interactive media to a plurality of mobile devices. A computer or PC comprising an interactive media generator is used to generate interactive media and communicate it to a distribution server. Mobile devices have an interactive media client component to receive and present interactive media to a user.

US 2008/0119132 relates to a media distribution server presenting interactive media on mobile devices and receives mobile user response interactively. During the presentation of interactive media the user is prompted with multiple choices for their selection, which can be provided using softkeys on the mobile device. The media distribution server prepares the subsequent portions of the interactive media and delivers them to the mobile device. In one embodiment, the necessary text, graphics, audio and video are assembled and integrated dynamically and is presented on the mobile device to the user. Further the mobile user is prompted to approve online purchases, make online appointment requests, show interest in products, etc. while browsing the interactive media on their mobile device. The media distribution server supports such activities as necessary.

U.S. Pat. No. 5,675,752 provides an interactive applications generator is utilized to generate an interactive application environment for use on a single server multi-client network computer system. The interactive applications generator permits a user to define a graphical user interface (GUI), that contains one or more display screens, for a customized interactive application environment. The interactive applications generator contains a screen template editor, a media frame editor, a screen editor, and an interactive presentation editor. The screen template editor is utilized to create generic screen templates, that contain generic screen template elements. The media frame editor is utilized to generate media frames by combining multimedia component elements in a time synchronized manner. The screen editor is utilized to generate the display screens including assigning functionality. In order to create a unique instance for each display screen for a particular interactive applications environment, the screen editor references generic screen templates and media frames. The interactive presentation editor is utilized to create the hierarchical structures that defines presentation of the display screens for the particular interactive presentation environment.

US 2002/0052781 relates to a systems, methods, computer program products, and combinations and sub-combinations thereof for enabling interactive advertisements (as well as other objects) to be loaded on mobile devices (as well as other types of devices), and for users of mobile devices to operate with such interactive advertisements on their mobile devices in an interactive manner while in an off-line mode.

U.S. Pat. No. 6,874,029 is directed to a method and system for controlling the state of an interactive application and controlling delivery of the interactive application to one or more users. The system of the present invention is a system for delivering an interactive application to one or more users of a communications network and may comprise an interactive application adapted to the communications network; a user access device adapted to receive said interactive application; control means for establishing parameters under which said interactive application is rendered on said user access device; and mediation means for establishing terms for the interaction between the at least one user and other users and the communications network.

US 2002/0083461 provides a system for providing one or more interactive applications to one or more users via a wireless communications network, the system including: one or more servers cooperating with the network to substantially deliver one or more interactive applications to one or more wireless access devices each corresponding to at least one of the users; wherein, after the one or more wireless access devices receive the substantially delivered one or more applications, upon request of one of the users the one or more corresponding wireless access devices receives communication from the server to facilitate the one of the users accessing the one or more interactive applications using the corresponding wireless access device.

The main disadvantage with these and other similar methods in the field is that some of these methods describe about particular implementation of interactive applications for example gaming applications and moreover they do not explain about short messaging protocol through which interactive applications can be transmitted to the wireless device which is a low bandwidth based distribution technique and which is required for fast and efficient wireless communication. The cited documents transmits the interactive applications containing high media content through the network which are not conducive to heavy over the air traffic and requires lot of bandwidth.

Based on the foregoing, there is a clear need for techniques that allow network-based services to be made readily available to a wide range of mobile devices or to support complex transactions, or both, without having to explicitly program each network-based service to support all forms of mobile devices. Further, there is also a need for designing a low footprint application so as to not to limit and deteriorate the mobile battery power and make efficient usage of phone memory and CPU. As already explained above, due to increase in bandwidth the battery life decreases so it is crucial to design a low bandwidth network application so as to maximize the network reach and to boost the life of the low processing power mobile phones.

OBJECTS AND SUMMARY

The object of the present invention is to provide a system and method for providing end to end interactive mobile applications.

It is an object of the present invention to provide a system and method for implementing and distributing mobile interactive applications via short messaging service center (SMSC).

It is also an object of the present invention to provide a platform and method using which interactive applications can be created for mobile devices, without the need to learn programming languages.

It is yet another object of the present invention to provide a small size application that resides on the mobile devices for rendering the interactive application so as to ensure efficient phone CPU and battery usage.

It is yet another object of the present invention to provide a low bandwidth SMS based distribution as it maximizes network reach and also reduces the size and number of SMS messages required for transmitting interactive applications to the mobile devices.

To achieve the aforementioned objects, the present invention provides a method for deploying interactive application on a plurality of mobile devices, the method comprising the steps of:
   delivering the interactive application to the plurality of mobile devices through short messaging service (SMS);
   rendering and executing the interactive application on the plurality of mobile devices; and
   receiving a response from a user of the mobile device through SMS on interacting with the interactive application.

The present invention further provides a system for deploying interactive application on a plurality of mobile devices, the system comprising of:
   means for delivering the interactive application to the plurality of mobile devices through short messaging service (SMS);
   means for rendering and executing the interactive application on the plurality of mobile devices; and
   means for receiving a response from a user of the mobile device through SMS on interacting with the interactive application.

The present invention provides a complete solution for implementing and distributing interactive mobile applications via short message service. The instant invention is a new process for developing, managing, transmitting and rendering mobile interactive applications through short messaging service. The mobile interactive application is developed using web based interactive development environment. Once the application is developed, it is delivered to large number of mobile stations through sms channel by an application provider. The received application on the mobile station is rendered and executed, and the user is able to interact with the application. Further, the user can also send the response to the application provider resulting in a two way communication.

DETAILED DESCRIPTION OF THE INVENTION

System and method for providing end to end interactive mobile applications are described. The present invention is not intended to be restricted to any particular form or arrangement, or any specific embodiment, or any specific use, disclosed herein, since the same may be modified in various particulars or relations without departing from the spirit or scope of the claimed invention herein below shown and described of which the system or method shown is intended only for illustration and disclosure of an operative embodiment and not to show all of the various forms or modifications in which this invention might be embodied or operated.

The present invention also known as InteractGadget provides a complete solution for implementing and distributing interactive mobile applications via short message service. The instant invention is a new process for developing, managing, transmitting and rendering mobile interactive applications through short messaging service. The mobile interactive application is developed using various InteractGadget components. Once the application is developed, the 'application provider' or the 'operator' can advertise the new application to millions of mobile stations through sms channel. The received application on the mobile station is rendered by one of the InteractGadget component, and the user is able to interact with the application. Further, the user can also send the response to the application provider resulting in a two way communication.

A preferred embodiment of said method and system for implementing and distributing mobile applications via short messaging service on mobile phones is described below with reference to the accompanying diagrams.

Figure 1:
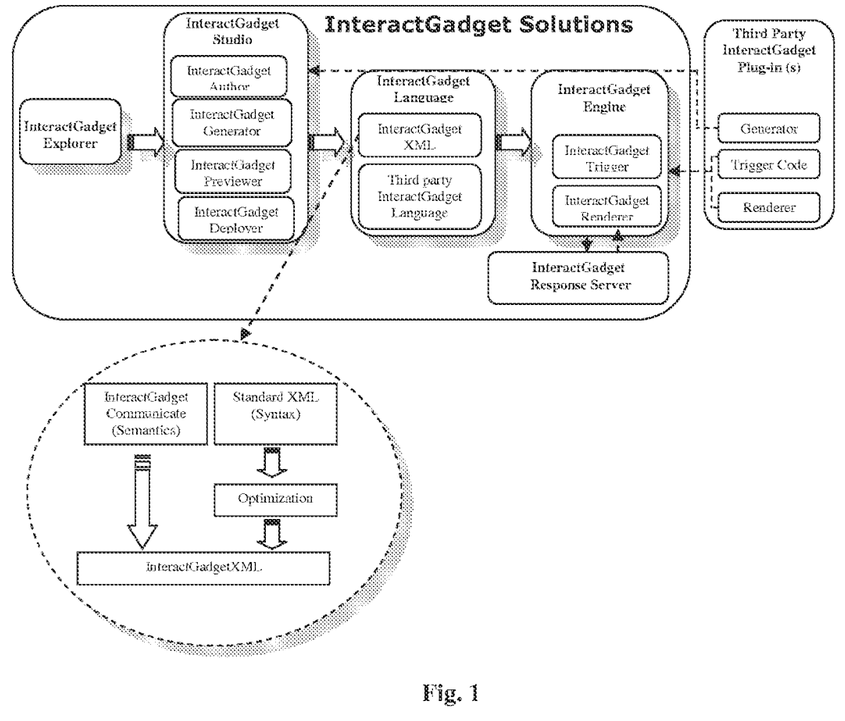
FIG. 1 illustrates the various components of the present invention for implementing and distributing interactive applications.

FIG. 1 depicts the various components of InteractGadget of the present invention for implementing and distributing interactive applications.

Figure 3:
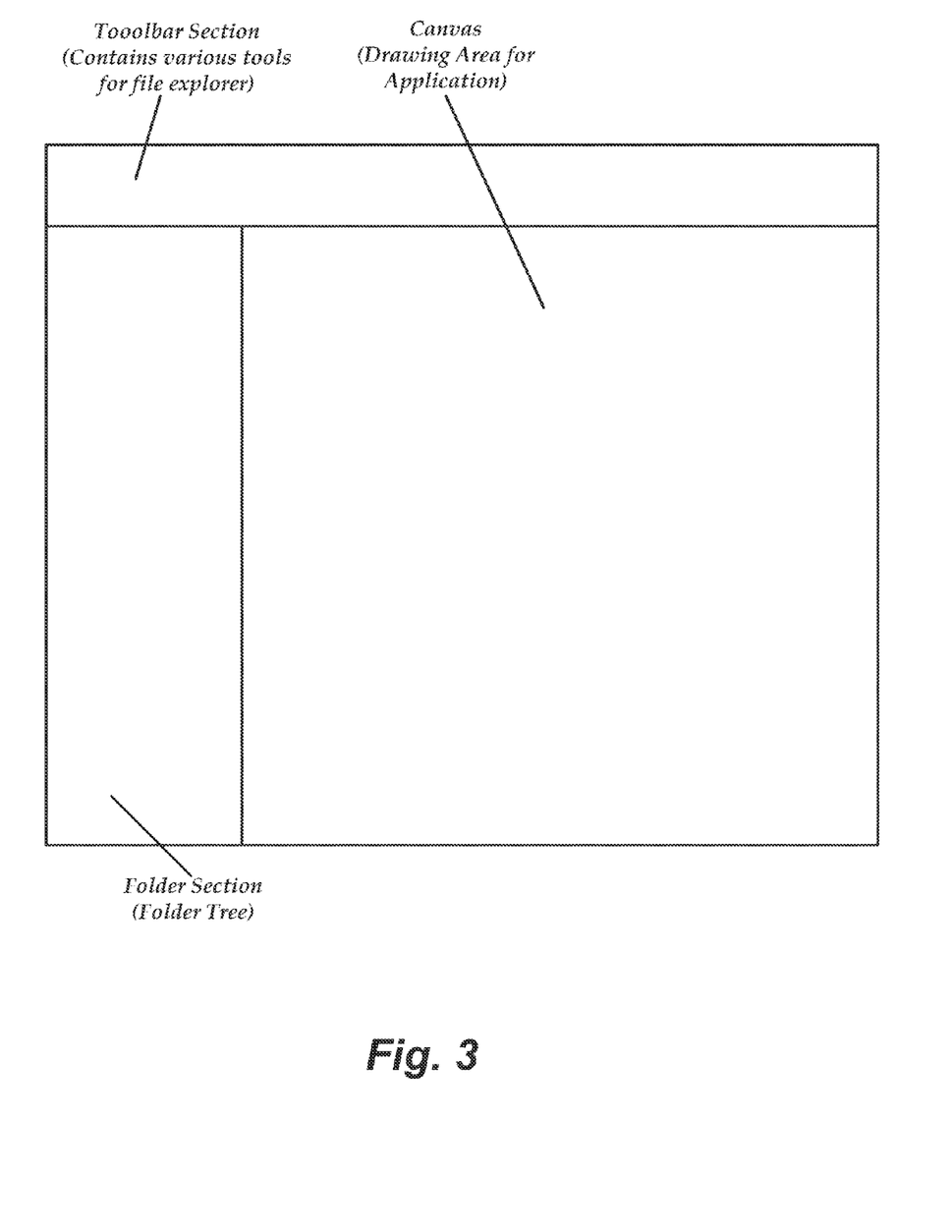
FIG. 3 illustrates the web based environment of InteractGadgetExplorer of the present invention.

Referring to FIG. 1, the first component is InteractGadgetExplorer. FIG. 3 depicts the web based environment of InteractGadgetExplorer. It is web based application that provides detailed information about your InteractGadget creations i.e. InteractGadget applications, private and shared folders. It can be used to create, move, delete and rename applications as well as perform other tasks like user authentications and authorization. It provides an overview of the different applications i.e. how the applications are organized. It enables the user to manage the applications. It provides security to applications from unauthorized access. It provides a secure user login for user authentication and also provides role based user authorization. It allows the sharing of the applications using public folder.

Figure 2:
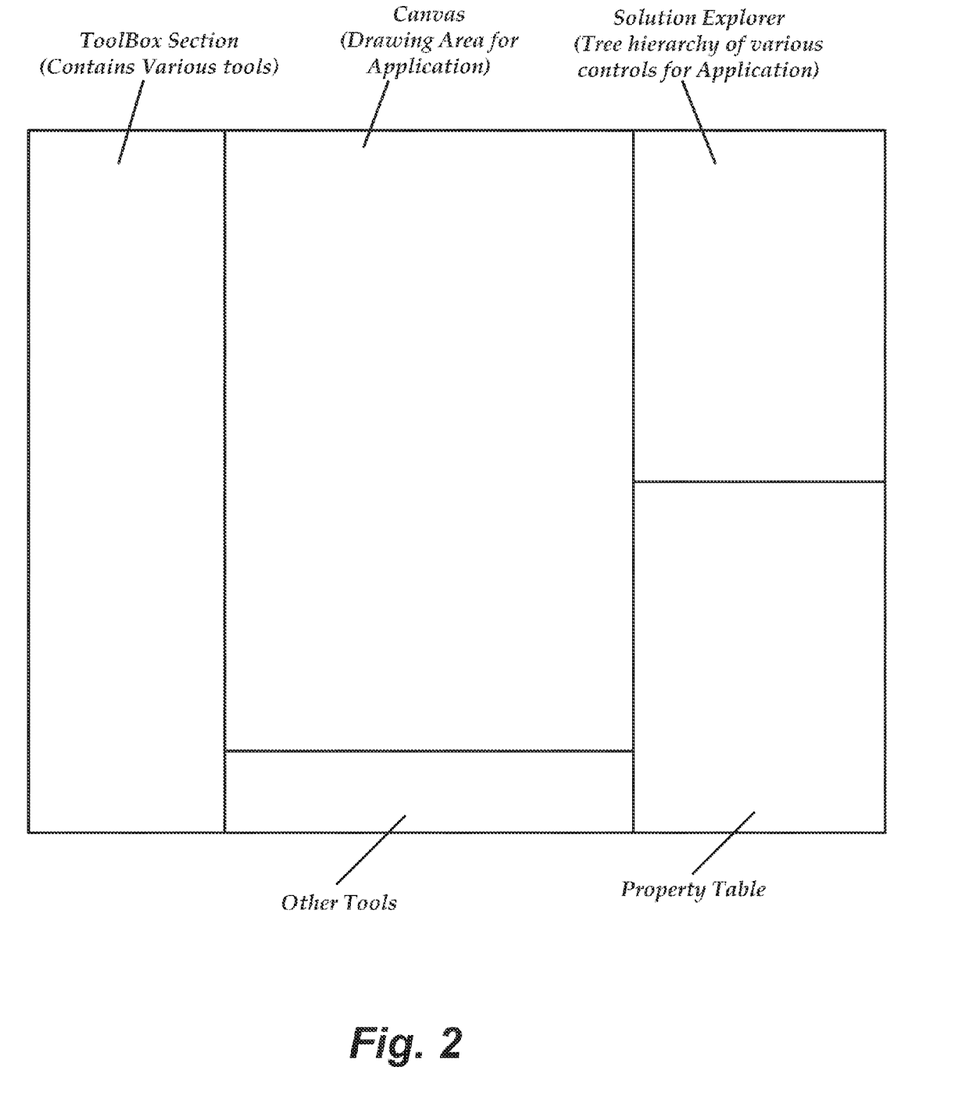
FIG. 2 illustrates the interactive development environment of InteractGadgetAuthor of the present invention.

Referring to FIG. 1, the second component is InteractGadgetStudio which is an Interactive Application Development and Management tool at server end and is capable of performing different functions starting from authoring till deployment of InteractGadget applications. InteractGadgetStudio( ) further consists of sub-components that are defined as follows:

i. InteractGadgetAuthor is a Web-based Graphical User Interface based tool for generating the look and feel of InteractGadget applications and writing business logic for the application using a "Rule, Event ⇌ Action" strategy without knowing any programming language using drag and drop techniques. It is a 100 percent web based integrated development environment (WYSIWYG i.e. what you see is what you get) using which anyone can drag and drop forms and widgets to create, preview and deploy an interactive application for various mobile handsets. Using InteractGadgetAuthor, user can create forms (screens) and can apply business logic to event based actions which are required to author any interactive application. The web based integrated development environment uses JavaScript, HTML and CSS and can run on all common browsers including Internet Explorer and Firefox. InteractGadgetAuthor can support multiple platforms and facilitates in creating interactive applications to deploy across various mobile platforms. InteractGadgetAuthor further contain components such as Toolbox, Canvas, Control panel, Solution explorer and Property explorer that allows the users to build graphically and logically rich applications. FIG. 2 depicts the interactive development environment of InteractGadgetAuthor. The function of the components is further clearly defined below.

a. Toolbox is a rectangular area which is dedicated for choosing controls available in the InteractGadget applications. These controls can further be categorized according to the group of controls like button, textbox etc.
   b. Canvas is the area where the user can drag and drop different controls, can resize controls, move and select the controls to change its properties. User can double click on any control to apply business logic.
   c. Control panel is the area of InteractGadgetAuthor which provides different functions initiation like preview, deploying, saving and loading the projects.
   d. Solution explorer shows the available forms and controls available in the project in a hierarchical manner. User can select any control from this area to change the configuration or properties of that particular control.
   e. Property explorer allows setting the attributes relating to different controls.

User can also describe the event based business logic for the application using InteractGadgetAuthor. The business logic of InteractGadget application using "Rule, Event ⇌ Action" strategy is defined as:

a. Each GUI widget has zero or more event
   b. On each GUI event we can define zero or more Rule
   c. Each Rule consists of zero or more Condition
   d. Each Rule consists of zero or more Action
   e. Action can be Change in any Property, Exit from Application, Screen Navigation, Send/Receive/Validate data from Server
   f. Condition is logical comparison of one or more attribute of application
   g. Based on Condition result Action will be executed ii. InteractGadgetGenerator can generate the InteractGadget application in InteractGadgetLanguage based upon InteractGadgetCommunicate semantics. The InteractGadgetLanguage can be either InteractGadgetXML or third party InteractGadgetLanguage.

iii. InteractGadgetPerviewer is a tool that facilitates to preview the application while you are developing so that you can get a feel on how the application will look at the target environment before it is actually deployed to that platform.

iv. InteractGadgetDeployer is a tool that facilitates the author to actually transmit the application over the particular selected network.

By referring to FIG. 1, the third component is InteractGadgetLanguage which is further of two types:
  i. InteractGadgetXML is a language whose syntaxes are based XML standards and converted into optimized binary format. InteractGadgetXML is a very efficient language in terms of required transmission bandwidth. Using InteractGadgetXML, user can send non textual data like images, sounds, etc. InteractGadgetXML language facilitates in handling the applications in which data changes very frequently such as weather, score board etc. It provides dynamic updates for such applications.
  ii. Third Party InteractGadgetLanguage is a language based on InteractGadgetCommunicate semantics and defined by third party. Third party InteractGadgetLanguage syntaxes are different from InteractGadgetXML but both of them share the semantics to define InteractGadget application. Third Party InteractGadgetLanguage can be integrate with InteractGadget System using a plug-in. This new plug-in will have three sub-components, Generator, Trigger Code and Renderer.

InteractGadgetLanguages are based on InteractGadgetCommunicate. It is the semantics to define GUI(Graphical User Interface) and the business logic of any particular InteractGadget application in terms of object hierarchy of the GUI and business logic components based on the "Rule, Event ⟶ Action" strategy. InteractGadgetCommunicate semantics are based upon the hierarchical model with parent child relationship. Following are example of InteractGadgetCommunicate elements and their relationship in hierarchical model.

Application
        Form
            Control
                Property
            Rules
                Condition based upon data
                    Control .value [Operator] Control .value
                    Control .value [Operator] Static Value
                    Control .value [Operator] Expression
                    Expression [Operator] Static Value
                    Expression [Operator] Expression
                Action
                    Change of Property with
                        A Static Value
                        Other Control Value's Property value
                        Based On Expression
                        Server Response string
                    Navigation to other screen
                    Exit
                    Send/Receive/Validate Response The attribute of the each element of InteractGadgetCommunicate semantics is defined below. Based on application requirement user can add new attribute or remove existing attribute.

Application
        ID—A unique id for every application
        Title—A string title for an application
        AuthKey—A unique 12 bit application authentication key
        Priority—Application priority
    Form
        Form Id—A unique form id
    Control
        Control Id—A unique control id
        Control Type—A unique control type
    Property
        Property Id—A unique Id for a property
        Property Type—A unique property type
        Value—String or numeric value based on property id, If a property has multiple values then a comma separated string will be send
    Rule
        Id—A unique Id for a rule
        Trigger Type—A numeric value which tells the type of a rule. Rule can be one of following type
            Time based Trigger
            Event based Trigger
        Event Control
        Event Id
    Condition
        Type—Type of condition (Conditional/Unconditional),
            Conditional: Conditional can be one of following.
                Condition based upon Time
                Condition based upon data
                    Control with Control
                    Control with Static Value
                    Control with Expression
                    Expression with Static Value
                    Expression with Expression
            Unconditional
        Operand A and Operand B—Value for operand A or B.
        Operand A Data Type and Operand B Data Type—Data type of operand. Data type can be one of following
            Integer
            String
            Boolean
            Date—Will be a string value
            Expression—Expression will be a Tag
            Property—Its combination of Control Id and Property Id
        Operator Id—Logical operator for condition. Operator can be one of following
            <
            >
            ==
            !=
            >=
            <=
            Contains
            Not contains
            Before
            After
            On
            Next Relation—It is logical operator Id, what will be the relation with next condition (AND-OR)
    Expression
        Id—A unique Expression ID
    Expression Item
        Expression Value Type
            Static Value
            Property
        Operator Id—same as conditional operator
    Action
        Type—Type of action. Action type can be one of following
            Modify Property
                A static Value
                A Property
                An Expression
                Get Response Navigation
Exit
Send Response
Target Control Id
Target Property Id
Static Value—In case of Property, It will be Form Id, Control Id
Response Server Id
Form Id
Response Type
Static Text
Property
Response Text
Response Server Address or Number The fourth component is InteractGadgetEngine as shown in FIG. 1.

Figure 4:
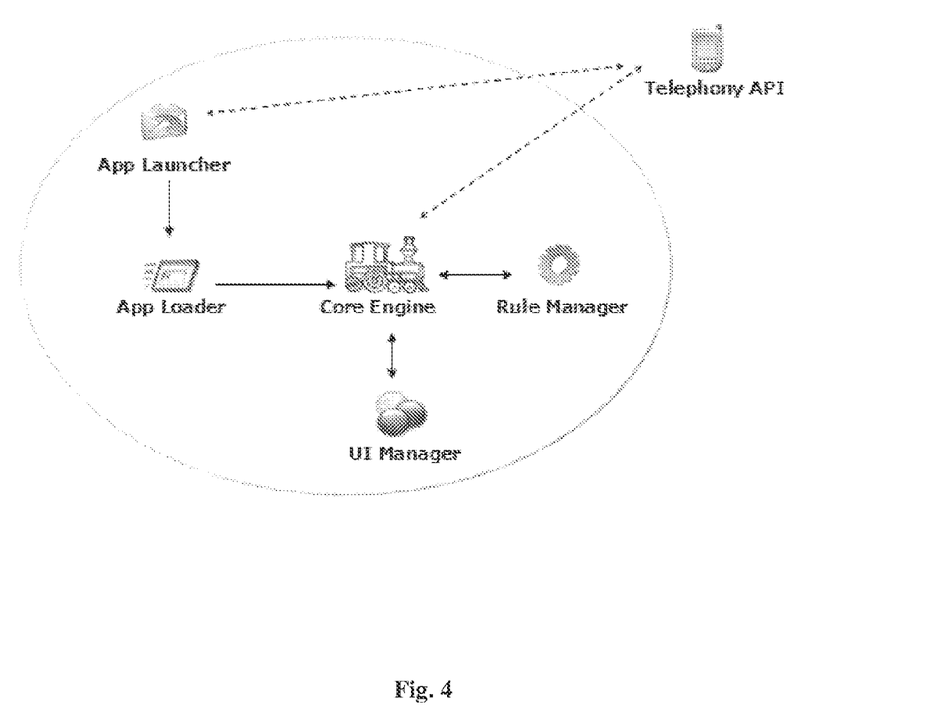
FIG. 4 illustrates the architecture of the InteractGadgetEngine of the present invention.

FIG. 4 depicts the architecture of the InteractGadgetEngine with various components.

App Launcher: App Launcher is the sub module of the application which registers itself with OS/VM on particular port for receiving the SMS. This sub-module is triggered by OS/VM, as soon as OS/VM receives any SMS on the registered port. InteractGadgetTrigger is the part of App Launcher sub-module which senses that InteractGadgetApplication is written in which particular InteractGadgetLanguage and calls appropriate sub-module of App Loader for rendering the application.

App Loader: App Loader is the sub module of the application which is responsible for reading the received application in the SMS and constructing the actual UI and business logic components which can be rendered/controlled on the native OS/VM. It can contain more than one InteractGadgetRenderers as plug-ins and each InteractGadgetRenderer is capable of understanding one unique InteractGadgetLanguage, this language can be InteractGadget native or third party language.

Core Engine: Core engine is the sub-modules which actually initiates the rendering of the application and initiates the code constructs to control the business logic written in the application. It initializes the UI manager with all the UI component details and initializes the rule manager for all the business logic components. Core engine can receive UI events from UI manager and based upon which it can use trigger rule manager to calculate and to take decision based upon the business logic constructs and UI event received. Core engine is the only sub-module which will be interacting with the non UI components of mobile device OS/VM and network resources (including InteractGadget application/response servers) using telephony APIs.

Rule Manager: Rule manager sub module will be triggered by core engine to store the business logic constructs received via SMS and its responsibility will be to take appropriate decision based on that business logic constructs and the user events received. This sub-module is handled by Core Engine.

UI Manager: UI manager is the sub-module which ultimately renders the UI components on the mobile device and listens to the user UI events on rendered components. Whenever it receives any event it is passed back to the Core engine for initiating the appropriate action on this event. This sub-module is handled by Core Engine.

InteractGadgetEngine is a CVM (Compact Virtual Machine) for InteractGadget application. It resides between InteractGadget application and device OS. It is a low footprint application at the client end which can understand the InteractGadget application generated by InteractGadgetStudio and which can render or facilitate in rendering the interactive application at client end. It is optimized to parse InteractGadgetXML and converts it into interactive application. It enables us to develop platform independent interactive content so that the InteractGadget application can reach large number of mobile users. For example, InteractGadgetEngine supports Window mobile platform as well as Java enable mobile phones. It can further provide support for other proprietary software platforms. It hides developers from the complexity of re-authoring content for every single platform. InteractGadgetEngine runs under privileged mode and can launch a sign application only after a security warning is given. Any unsigned application is ignored by the application launcher. It provides rich graphical user widgets to facilitate in creating attractive graphical user interfaces. It supports the widgets such as label, textbox, checkbox, list box, combo box, button, hidden etc. Additionally it can also support callouts, backgrounds, keyboard, and radio button. It provides the support for content on demand by interacting with third party SMS gateway to get demand data for InteractGadget application. InteractGadgetEngine also supports dynamic updates for applications such as weather, scoreboard etc. These types of applications need real time data that should be updated from time to time. Once the application is launched on the mobile phone, it updates the data regularly. InteractGadgetEngine supports two way communication i.e. users can also send their response to application provider. InteractGadgetEngine is further subdivided in two components:

i. InteractGadgetRenderer renders the InteractGadget application on native platform and executes according to business logic defined there-in. It can be native InteractGadgetRenderer that can understand InteractGadgetXML or Third Party InteractGadgetRenderer that can understand third party InteractGadgetLanguage which is a plug-in.

ii. InteractGadgetTrigger is an intelligent sub-component which can differentiate between InteractGadget and non-InteractGadget transmitted message. For InteractGadget messages, it can launch either InteractGadgetRenderer (if the received InteractGadgetApplication is in InteractGadgetXML) or it can be any Third Party InteractGadgetRenderer if the received InteractGadget application is a third party InteractGadgetLanguage application. InteractGadgetTrigger can have different third party plug-ins to understand third party InteractGadgetLanguages. InteractGadgetTrigger simply ignores non-InteractGadget messages.

Figure 5:
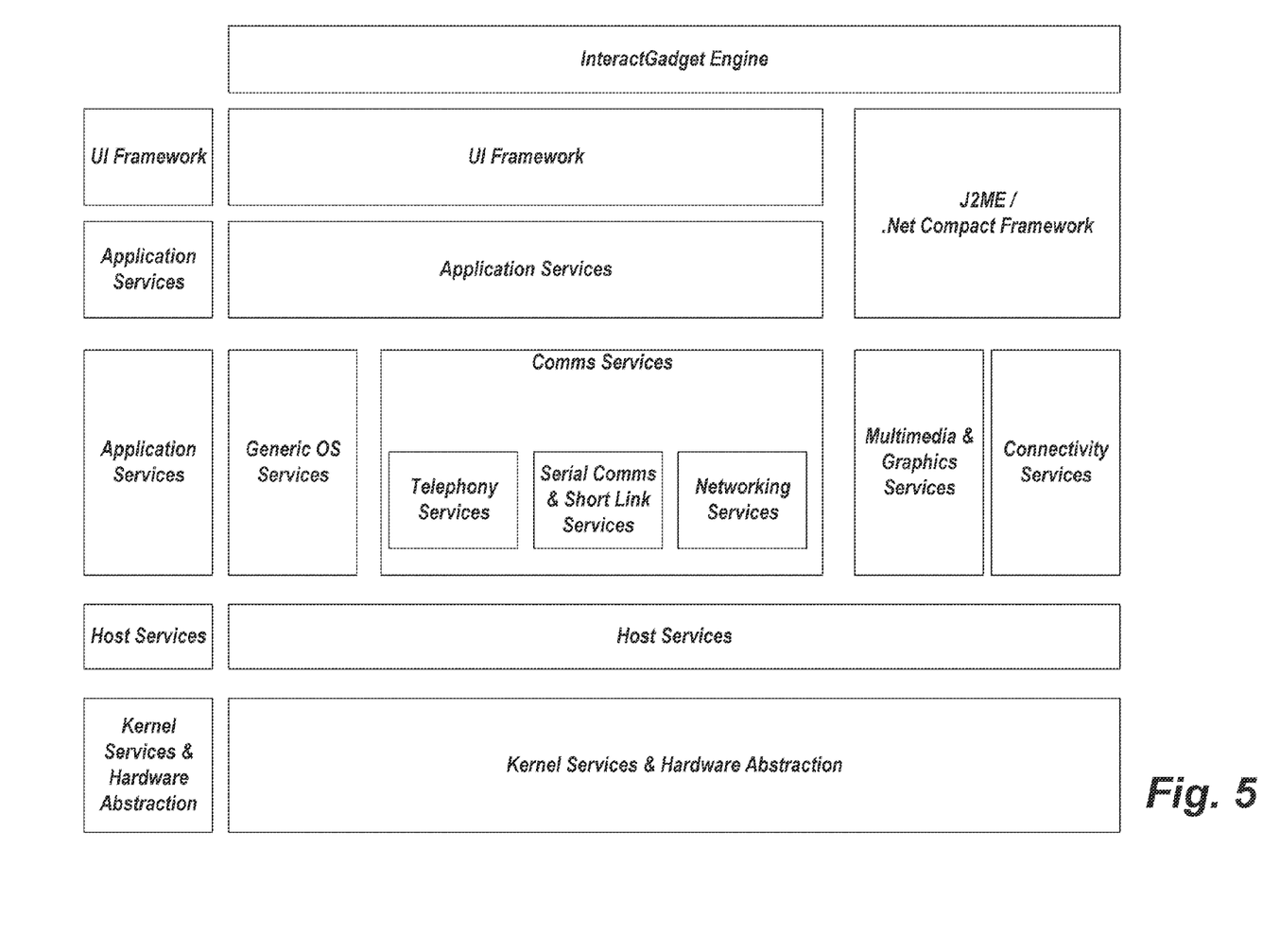
FIG. 5 illustrates the location and interaction of the InteractGadgetEngine with the mobile operating system of the present invention.

FIG. 5 illustrates the position of the InteractGadgetEngine in the mobile software stack. InteractGadgetEngine is placed on the top of all OS services and UI frameworks and it can also use the J2ME virtual machine and .Net compact framework if present in the OS. So, InteractGadgetEngine is written to make use of all the capabilities of OS in the best way. It makes the InteractGadgetApplication independent of platform, as InteractGadgetEngine understand the native OS and VM and can render the received application, in a way, so that user may have universal look and feel experience for a particular application, irrespective of the platform on which it is being rendered.

Figure 6:
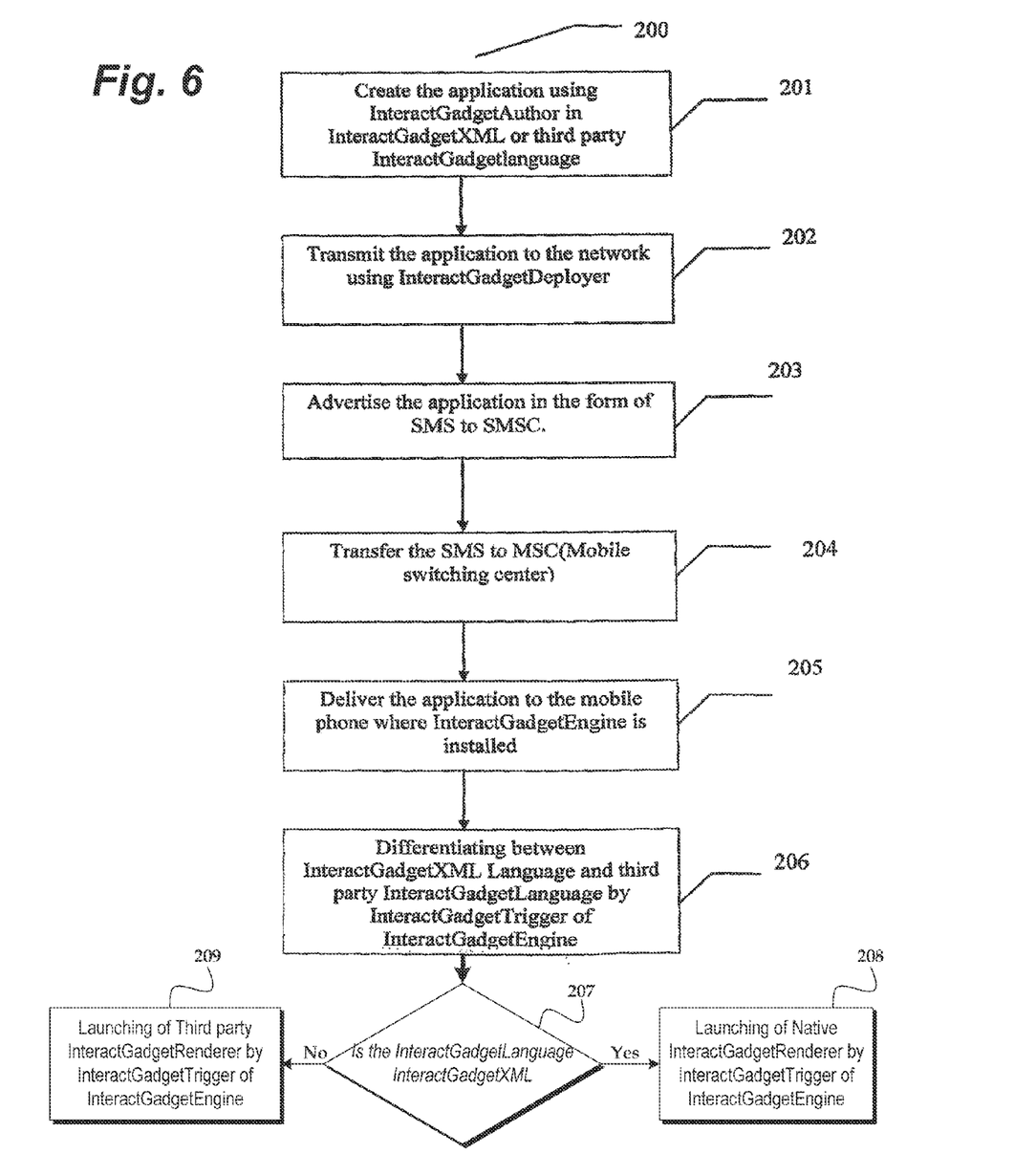
FIG. 6 illustrates an exemplary method of implementation of the present invention for providing interactive applications.
Figure 7:
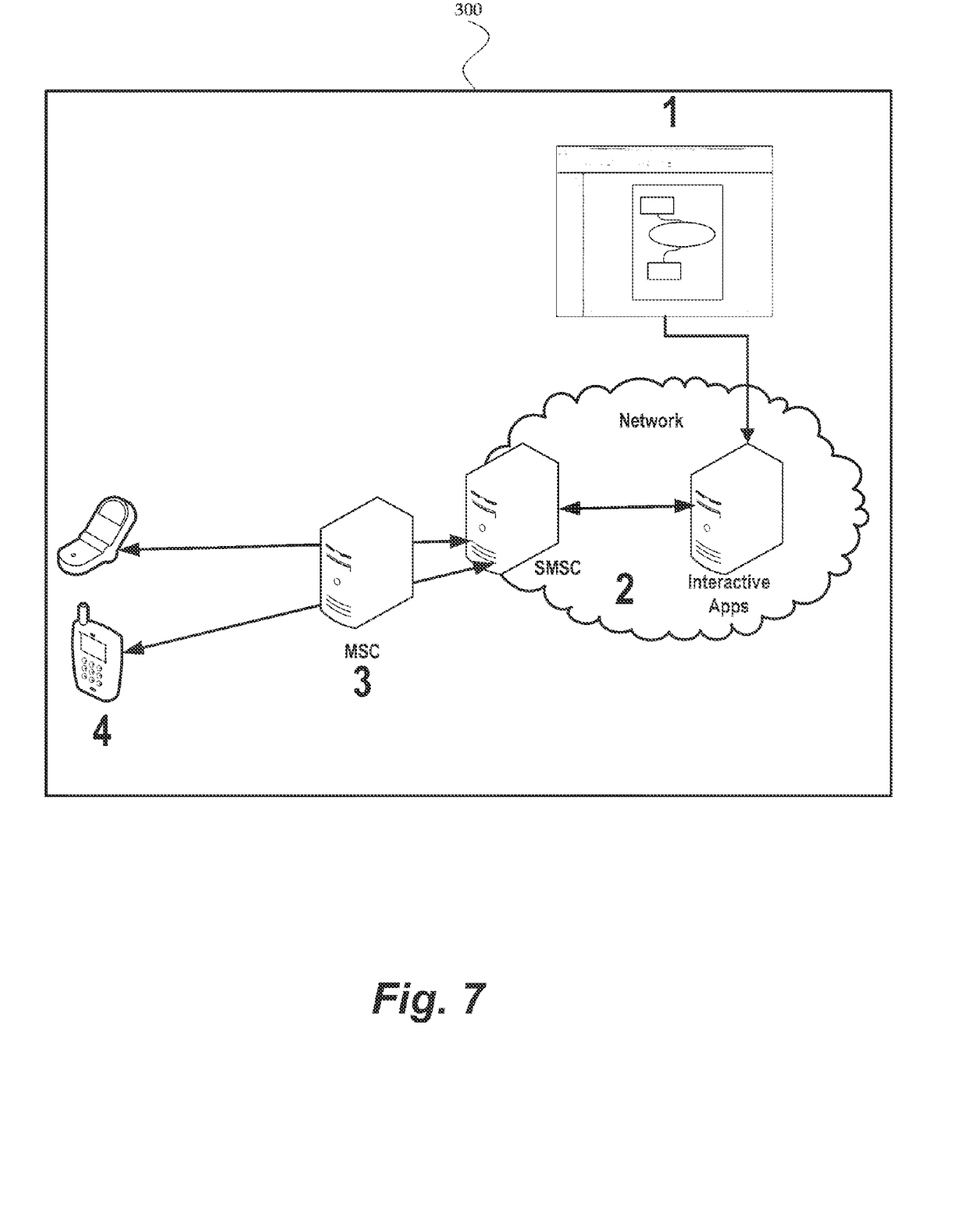
FIG. 7 illustrates an exemplary system of implementation of the present invention for providing interactive applications.

FIGS. 6 and 7 illustrates an exemplary method 200 and system 300 of implementing and distributing the interactive application according to the present invention.

At block 201, the interactive application is developed by using InteractGadgetAuthor and InteractGadgetGenerator component of InteractGadgetStudio. InteractGadgetGenerator generates the InteractGadget application in InteractGadgetLanguage that is either InteractGadgetXML or third party InteractGadgetLanguage. In order to get a feel on how the application will look at the target environment, we can preview it using InteractGadgetPerviewer component of InteractGadgetStudio.

At block 202, the resulting application is then sent to the Application Server through the existing network using InteractGadgetDeployer component of InteractGadgetStudio, which publishes a special SMS when it needs to advertise an interactive application.

At block 203, the interactive application in the form of SMS is delivered to short message service center (SMSC). The purpose of short messaging service center is to receive a short message from any source and deliver to a particular subscriber. It stores and forward messages to and from the mobile station. The SMSC further includes various interfaces to receive short messages origination from various sources and protocols.

At block 204, the application from SMSC is further sent to mobile switching center (MSC) through a gateway to communicate with the rest of SMS network. The mobile switching center (MSC) performs switching and call control functions, and receives short messages from the SMSC for delivery to appropriate mobile sub scriber.

At block 205, the InteractGadget application is finally delivered to the mobile subscriber, where InteractGadgetEngine component is installed.

At block 206, InteractGadgetTrigger component of InteractGadgetEngine will sense whether it is an InteractGadgetXML application or third party InteractGadgetLanguage application.

At block 207, the result obtained at block 206 is used and a decision is made regarding the language of the application in which it is developed. If the language in which the application is developed is InteractGadgetXML, then at block 208 native InteractGadgetRenderer is launched by the InteractGadgetTrigger component of InteractGadgetEngine else at block 209 Third Party InteractGadgetRenderer is launched to render third party InteractGadget application on the mobile phone. InteractGadgetEngine supports two way communication and allow the users to send their response to application provider via short messaging service through the same channel from which the application was received.

EXAMPLES

Figure 8:
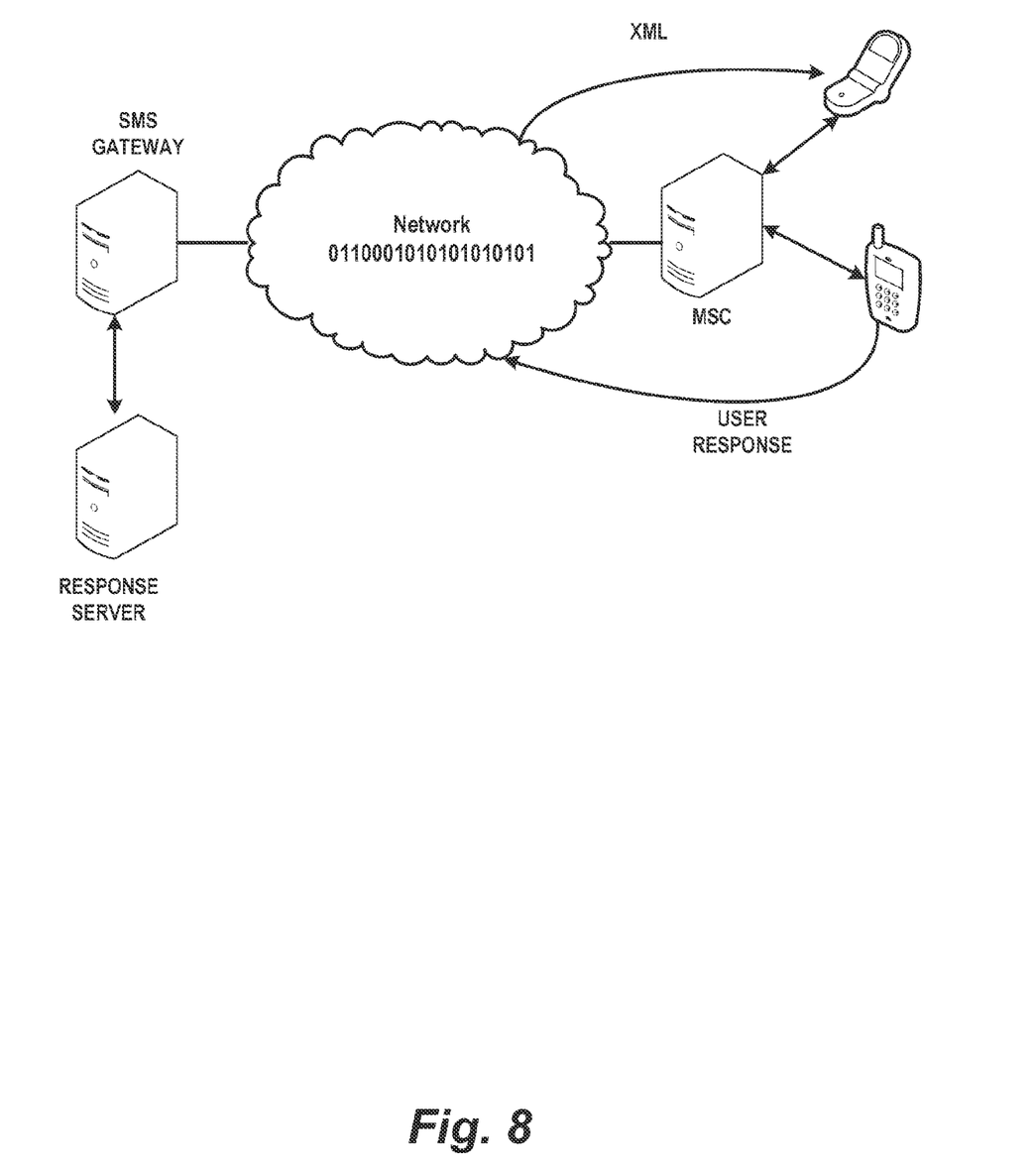
FIG. 8 illustrates the graphical workflow for downloading various interactive applications through SMS.
Figure 9:
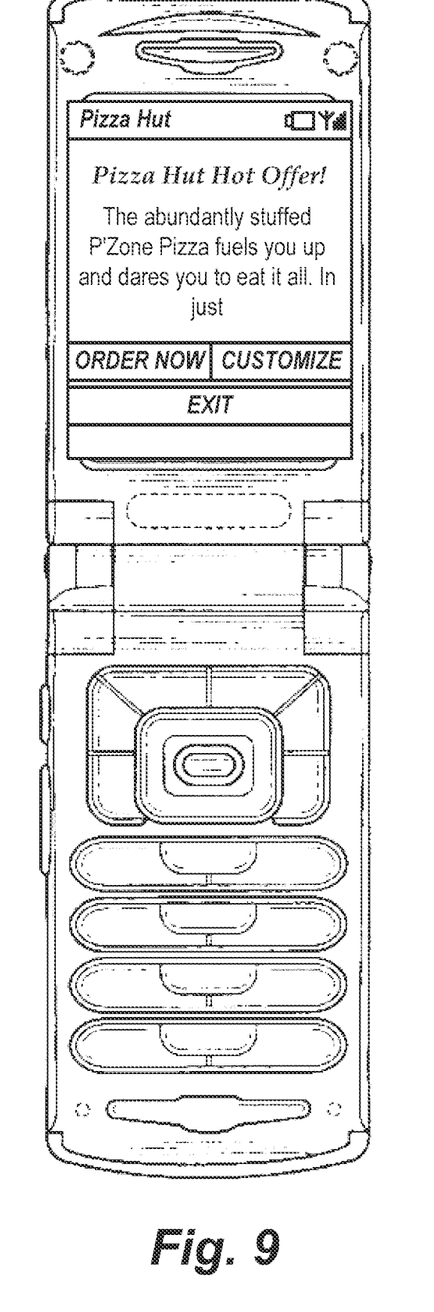
FIG. 9 illustrates the screen of the mobile device when an interactive application for example a pizza order application is downloaded on the mobile phone.

The instant invention can be explained with the help of following examples as illustrated in FIG. 8 which depicts how the application is downloaded on the mobile device through the network and the response sent by the user of the mobile device back to the content provider.
Pizza Order System with Special 'Deal of Day' Offers as Illustrated in FIG. 9
Description
A Pizza vendor would like to send 'Offer of the Day' to a larger number of customers in an interactive way so that customers can place their order.
The Need
Pizza vendor needs a wide distribution advertisement network which can ensure that their customers are aware of new deals and offers. In addition, they want a platform which allows them to set up an automated 1-click-order-place process which can also incorporate customized order (add topping, soft drinks, etc), advertisements and logos.
How InteractGadget Helps
The Pizza vendor creates interactive application for 'Deals of the Day' as desired using InteractGadgetAuthor, or, simply integrates the XML generator into their own workflow application. Once ready, the company uses InteractGadget technology to push the advertisement to phones over SMS. At this stage, each mobile phone's InteractGadgetEngine receives the SMS, decodes the special binary message and presents the interactive Pizza application to the customer.

This compact XML based application contains all the navigation, screens and contents of offers. When the user clicks on any of the GUI control for instance on the 'Order now', the application takes the user to the content provider through the network for placing a request or selecting other options. Further, InteractGadget technology provides a 2 way protocol that also allows for responses to be sent.

The system and method described above and illustrated in the figures are presented by way of example only and are not intended as a limitation upon the concepts and principles of the present invention. Elements and components described herein may be further divided into additional components or joined together to form fewer components for performing the same functions. As such, it will be appreciated by one having ordinary skill in the art that various changes in the elements and their configuration and arrangement are possible without departing from the spirit and scope of the present invention.

We claim:

1. A method for deploying interactive applications on a plurality of mobile devices comprising:
    delivering an interactive application to a mobile device included in the plurality of mobile devices through short messaging services (SMS), wherein delivery of the interactive application to the mobile device is initiated by an application provider, the interactive application specified via a platform-independent semantic language for delivery via the SMS, the interactive application including:
        a graphical user interface element to render on the mobile device; and
        event handling logic for an interaction with the graphical user interface element;
    rendering and executing the interactive application delivered through the SMS on the mobile device; and
    receiving a response message from a user of the mobile device through the SMS in response to the interaction with the graphical user interface element included in the interactive application.

2. The method as claimed in claim 1, wherein the interactive application is created or customized using a web based integrated development environment based on pre-defined syntaxes and semantics.

3. The method as claimed in claim 1, wherein the interactive application is developed without the need of knowing any programming language.

4. The method as claimed in claim 1, wherein the web based integrated development environment comprises of at least one component for creating or customizing the interactive application.

5. The method as claimed in claim 1, wherein there is an update and delivery of data of the interactive applications to the mobile devices.

6. The method as claimed in claim 1, wherein the rendering and executing step is performed by a small size application residing on the mobile device.

7. The method as claimed in claim 1, wherein the interactive application is managed, secured or shared by a web based explorer.

8. The method as claimed in claim 1, wherein the interactive application comprises textual data, or graphics or a combination thereof.

9. The method as claimed in claim 1, wherein the interactive application developed is independent of the hardware and software platform of the mobile device where it is deployed.

10. The method as claimed in claim 1, wherein the interactive application is generated in at least one language.

11. The method as claimed in claim 1, wherein only a signed interactive application is rendered and executed to provide enhanced security features.

12. The method as claimed in claim 1, wherein the mobile device is a cellular phone, PDA, or Smart phone.

13. A system for deploying interactive applications on a plurality of mobile devices, wherein deployment of the interactive application is initiated by an application provider, the system comprising:
   a means for delivering an interactive application to a mobile device included in the plurality of mobile devices through short messaging service (SMS), the interactive application specified via a platform-independent semantic language for delivery via the SMS, the interactive application including:
      a graphical user interface element to render on the mobile device; and
      event handling logic for an interaction with the graphical user interface element;
   a means for rendering and executing the interactive application delivered through the SMS on the mobile device; and
   a means for receiving a response message from a user of the mobile device through the SMS in response to the interaction with the graphical user interface element included in the interactive application.

14. The system as claimed in claim 13, wherein the interactive application is created or customized using web based integrated development environment based on pre-defined syntaxes and semantics.

15. The system as claimed in claim 13, wherein the interactive application is developed without the need of knowing any programming language.

16. The system as claimed in claim 13, wherein the web based integrated development environment comprises of at least one component for creating or customizing the interactive application.

17. The system as claimed in claim 13, wherein there is an update and delivery of data of the interactive application to the mobile device.

18. The system as claimed in claim 13, wherein the rendering and executing is performed by a small size application residing on the mobile device.

19. The system as claimed in claim 13, wherein the interactive application is managed, secured or shared by a web based explorer.

20. The system as claimed in claim 13, wherein the interactive application comprises textual data, or graphics or a combination thereof.

21. The system as claimed in claim 13, wherein the interactive application developed is independent of the hardware and software platform of the mobile device where it is deployed.

22. The system as claimed in claim 13, wherein the interactive application is generated in at least one language.

23. The system as claimed in claim 13, wherein only a signed interactive application is rendered and executed to provide enhanced security features.

24. The system as claimed in claim 13, wherein the mobile device is a cellular phone, PDA or Smart Phone.

25. A non-transitory computer program product for deploying interactive applications on a plurality of mobile devices, comprising one or more computer readable media configured to:
   deliver an interactive application to a mobile device through short messaging services (SMS), wherein delivery of the interactive application to the mobile device is initiated by an application provider, the interactive application specified via a platform-independent semantic language for delivery via the SMS, the interactive application including:
      a graphical user interface element to render on the mobile device; and
      event handling logic for an interaction with the graphical user interface element;
   initiate rendering and execution of the interactive application delivered through the SMS on the mobile device; and
   receive a response message from a user of the mobile device through the SMS in response to the interaction with the graphical user interface element included in the interactive application.

\* \* \* \* \*